(12) United States Patent
Ikegami

(10) Patent No.: US 11,700,446 B2
(45) Date of Patent: Jul. 11, 2023

(54) INFORMATION PROCESSING APPARATUS, SYSTEM, CONTROL METHOD OF INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Hideyuki Ikegami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 16/903,887

(22) Filed: Jun. 17, 2020

(65) Prior Publication Data
US 2020/0412974 A1 Dec. 31, 2020

(30) Foreign Application Priority Data

Jun. 25, 2019 (JP) .................. 2019-117716

(51) Int. Cl.
*H04N 5/232* (2006.01)
*G06F 3/04845* (2022.01)
(Continued)

(52) U.S. Cl.
CPC ....... *H04N 23/631* (2023.01); *G06F 3/04845* (2013.01); *G06F 9/542* (2013.01);
(Continued)

(58) Field of Classification Search
CPC ....... H04N 5/232933; H04N 5/232945; H04N 5/23296; H04N 5/2351; H04N 23/631;
(Continued)

(56) References Cited

U.S. PATENT DOCUMENTS 8,885,069 B2 * 11/2014 Kunishige .......... H04N 5/23219
348/240.99
2010/0157107 A1 * 6/2010 Iijima ................ H04N 5/23219
348/240.99
(Continued)

FOREIGN PATENT DOCUMENTS

JP  2002209134 A  7/2002
JP  2008067374 A  3/2008
(Continued)

OTHER PUBLICATIONS

Notice of Reasons for Refusal issued by the Japan Patent Office dated Mar. 12, 2021 in corresponding JP Patent Application No. 2019-117716, with English translation.

*Primary Examiner* — Shahbaz Nazrul
(74) *Attorney, Agent, or Firm* — Carter, DeLuca & Farrell LLP

(57) ABSTRACT

An information processing apparatus, comprising a display control unit configured to display, in a display area of a display device, an image captured by an imaging apparatus, an area designation unit configured to designate an area for the image displayed in the display area, an enlargement unit configured to extract and to enlarge and display a part of the image displayed in the display area, a determination unit configured to determine whether a position of the designated area is outside the display area as a result of enlarging and displaying the part of the image displayed in the display area, and a notification unit configured to notify, when a determination is made such that the position of the designated area is outside the display area, of the determination.

18 Claims, 13 Drawing Sheets

(51) Int. Cl.
  *G06F 9/54*    (2006.01)
  *H04N 23/63*   (2023.01)
  *H04N 23/69*   (2023.01)

(52) U.S. Cl.
  CPC ........... *H04N 23/635* (2023.01); *H04N 23/69* (2023.01); *G06F 2203/04806* (2013.01)

(58) Field of Classification Search
  CPC ...... H04N 23/635; H04N 23/69; H04N 23/71; G06F 3/04845; G06F 9/542; G06F 2203/04806
  See application file for complete search history.

(56) References Cited

U.S. PATENT DOCUMENTS

| | | | |
|---|---|---|---|
| 2010/0277620 A1* | 11/2010 | Iijima | H04N 5/349 348/222.1 |
| 2015/0199098 A1 | 7/2015 | Park | |
| 2020/0193585 A1 | 6/2020 | Ikegami | |

FOREIGN PATENT DOCUMENTS

| | | | |
|---|---|---|---|
| JP | 2008172623 A | 7/2008 |
| JP | 2010124121 A | 6/2010 |
| JP | 2013239861 A | 11/2013 |

* cited by examiner

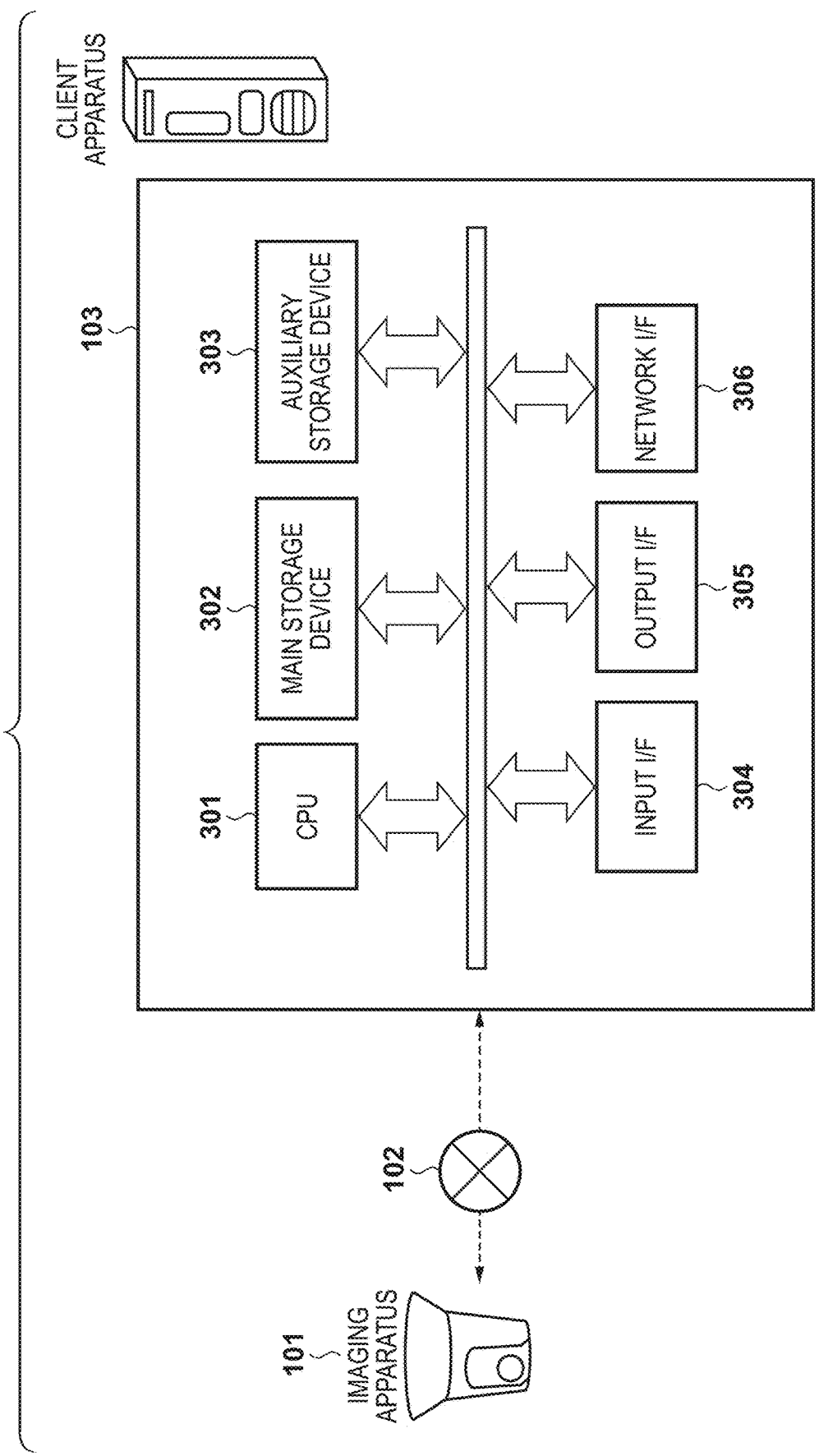

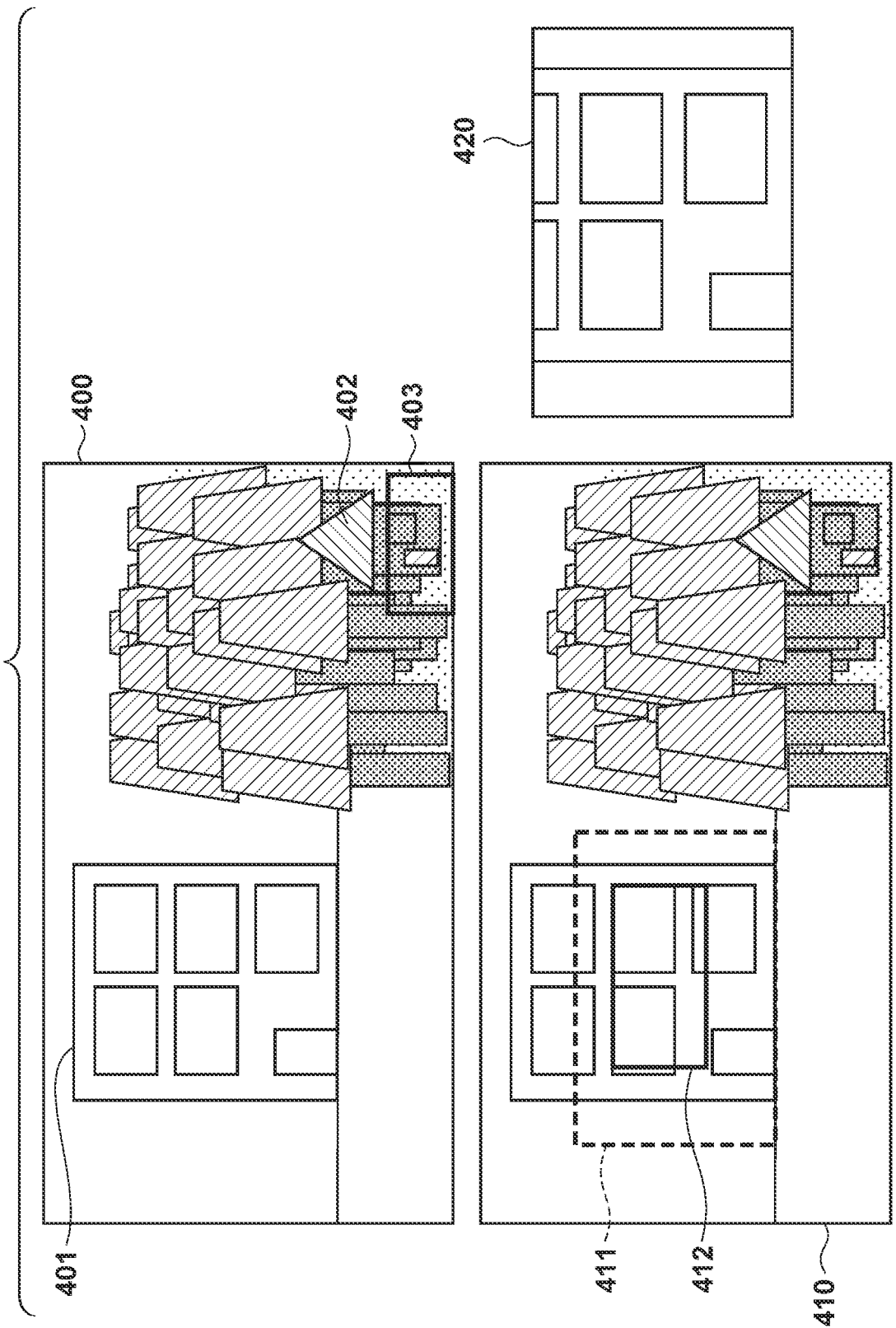

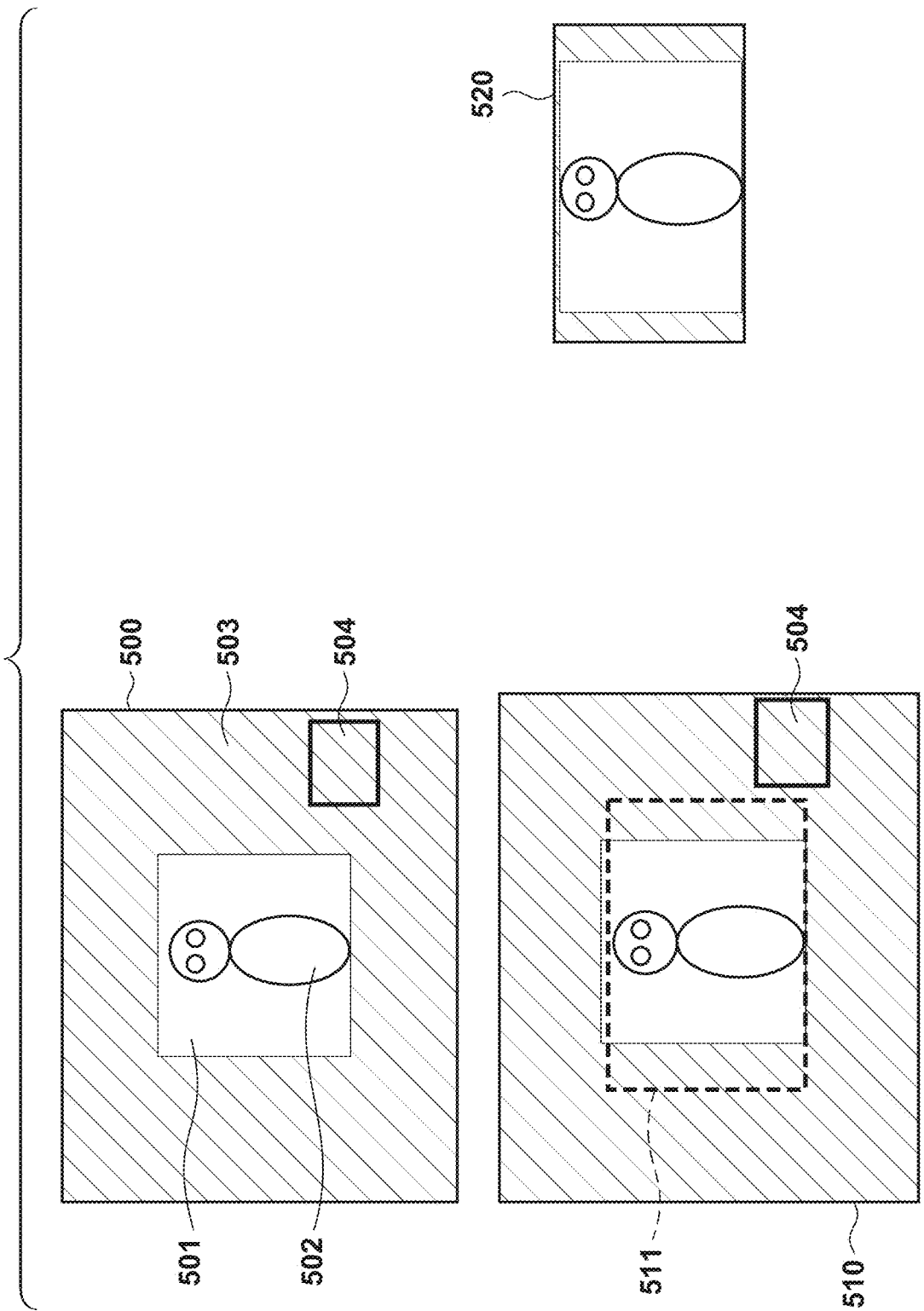

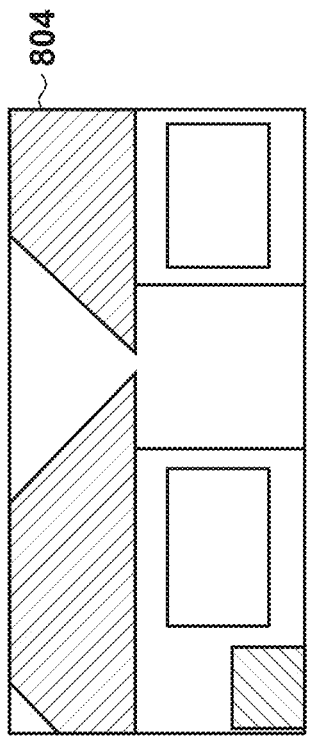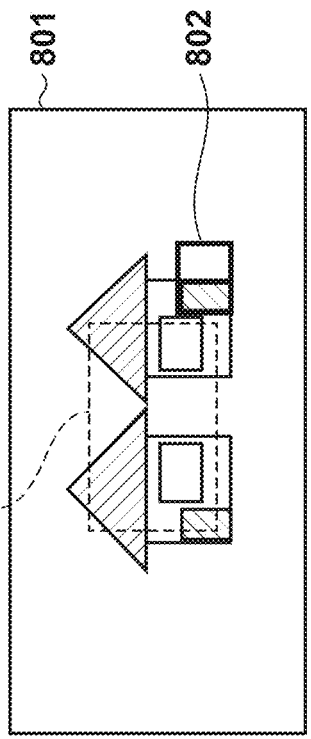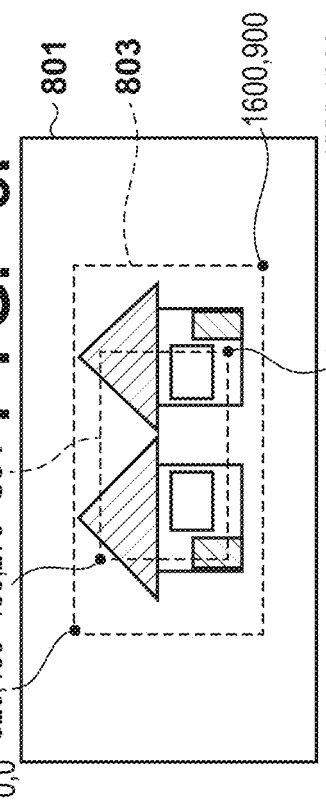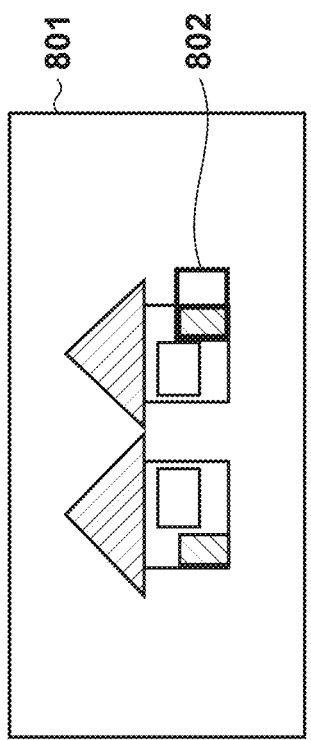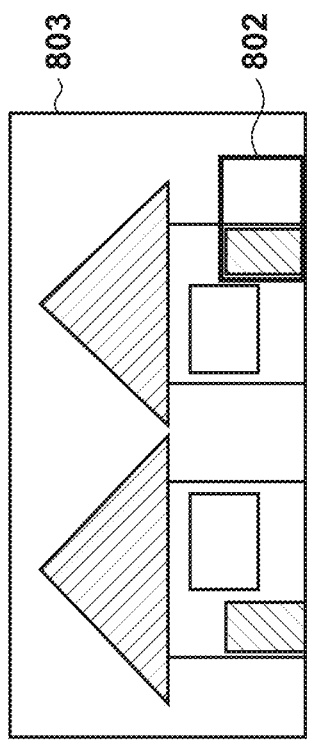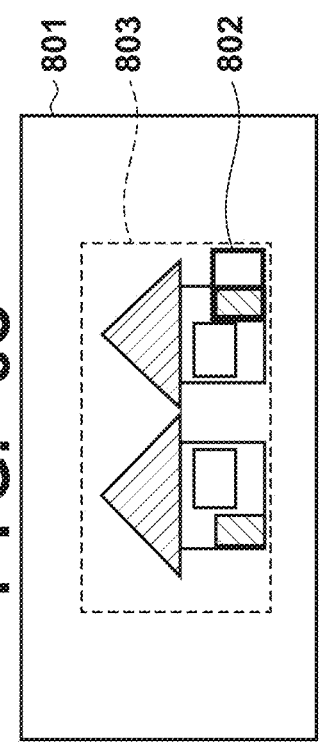

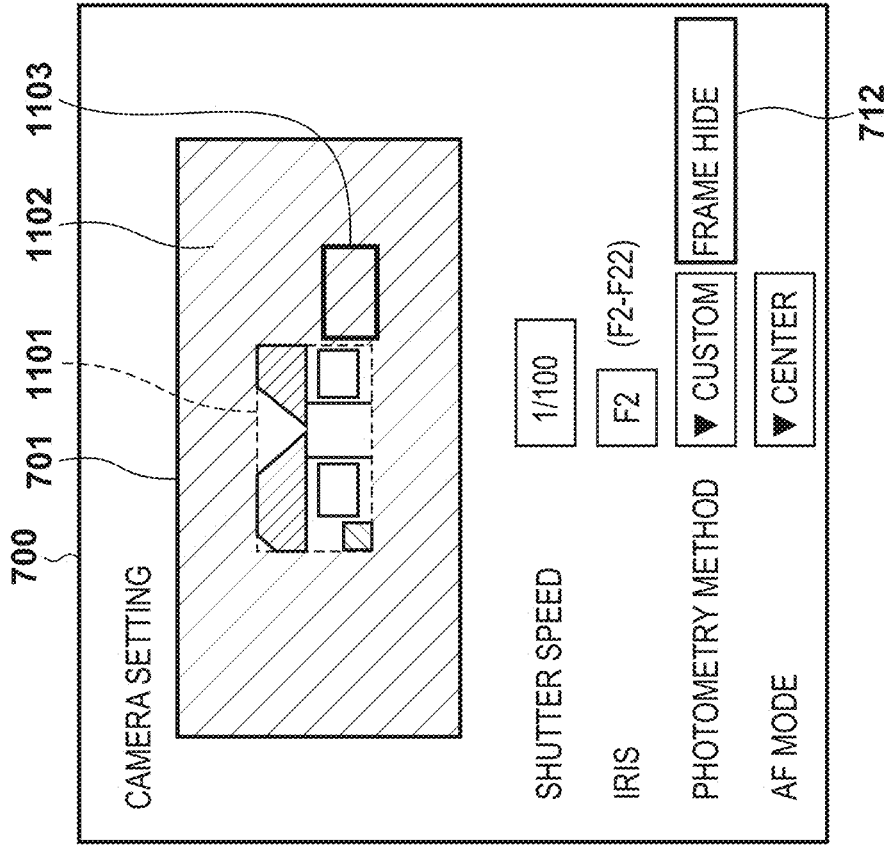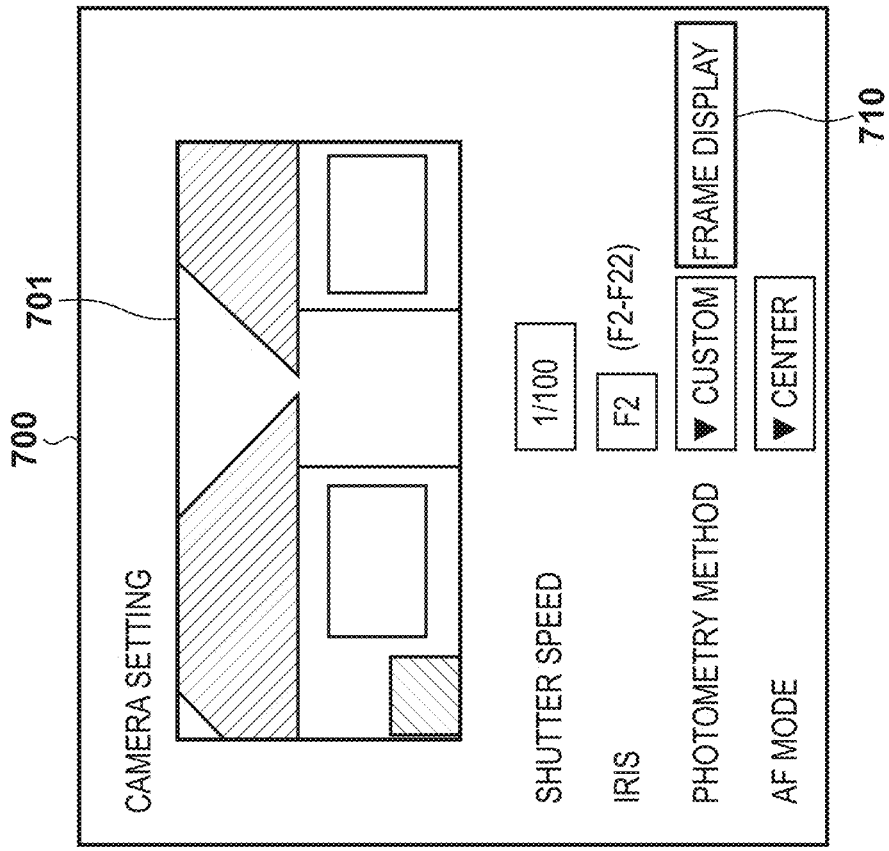

INFORMATION PROCESSING APPARATUS, SYSTEM, CONTROL METHOD OF INFORMATION PROCESSING APPARATUS, AND NON-TRANSITORY COMPUTER-READABLE STORAGE MEDIUM

BACKGROUND OF THE INVENTION

Field of the Invention

The present disclosure relates to an information processing apparatus, a system, a control method of an information processing apparatus, and a non-transitory computer-readable storage medium.

Description of the Related Art

In a network camera or a digital camera, there is a function that allows a user to designate a photometry area for determining exposure, an area for determining focus, or the like, among imaging conditions. This feature allows the user to designate an area of interest to obtain an image that is suitable for that area.

Japanese Patent Laid-Open No. 2010-124121 discloses selecting any size from among multiple sizes for an area of focus and freely setting the area by moving the selected size frame. US-2015-199098 discloses setting areas for focus and for photometry sequentially.

When the viewing angle is changed by a digital zoom or the like after the area is set by using the conventional technology, it is assumed that the position the area is to be moved to after the viewing angle is changed is different depending on the user's request or the situation or environment during imaging. However, Japanese Patent Laid-Open No. 2010-124121 and US-2015-199098 do not consider whether the position of the area should be changed after the viewing angle is changed following the setting of the area.

SUMMARY OF THE INVENTION

A technique related to control of whether the position of the area should be changed, when the viewing angle is changed after the setting of the area, is provided.

One aspect of embodiments relates to an information processing apparatus, comprising, a display control unit configured to display, in a display area of a display device, an image captured by an imaging apparatus, an area designation unit configured to designate an area for the image displayed in the display area, an enlargement unit configured to extract and to enlarge and display a part of the image displayed in the display area, a determination unit configured to determine whether a position of the designated area is outside the display area as a result of enlarging and displaying the part of the image displayed in the display area, and a notification unit configured to notify, when a determination is made such that the position of the designated area is outside the display area, of the determination.

Further features of the present invention will become apparent from the following description of exemplary embodiments (with reference to the attached drawings).

BRIEF DESCRIPTION OF THE DRAWINGS

FIG. 3 is a block diagram illustrating an example of an internal configuration of a client apparatus 103 according to an embodiment.

FIG. 4 is an explanatory diagram of an example in which a frame to be set as a photometry area is moved into a distribution image area when digital zoom is performed after a photometry area is designated.

FIG. 5 is an explanatory diagram of an example in which the position of the frame to be set as a photometry area is kept at the position before the digital zoom when a digital zoom is performed after the photometry area is designated.

FIGS. 8A to 8F are explanatory diagrams illustrating an example of a relationship between a position of a frame of a photometry area and a distribution image according to a digital zoom setting according to an embodiment.

FIGS. 11A and 11B are explanatory diagrams of an example of a display form of a setting screen 700 corresponding to Embodiment 2.

DESCRIPTION OF THE EMBODIMENTS

Figure 1:
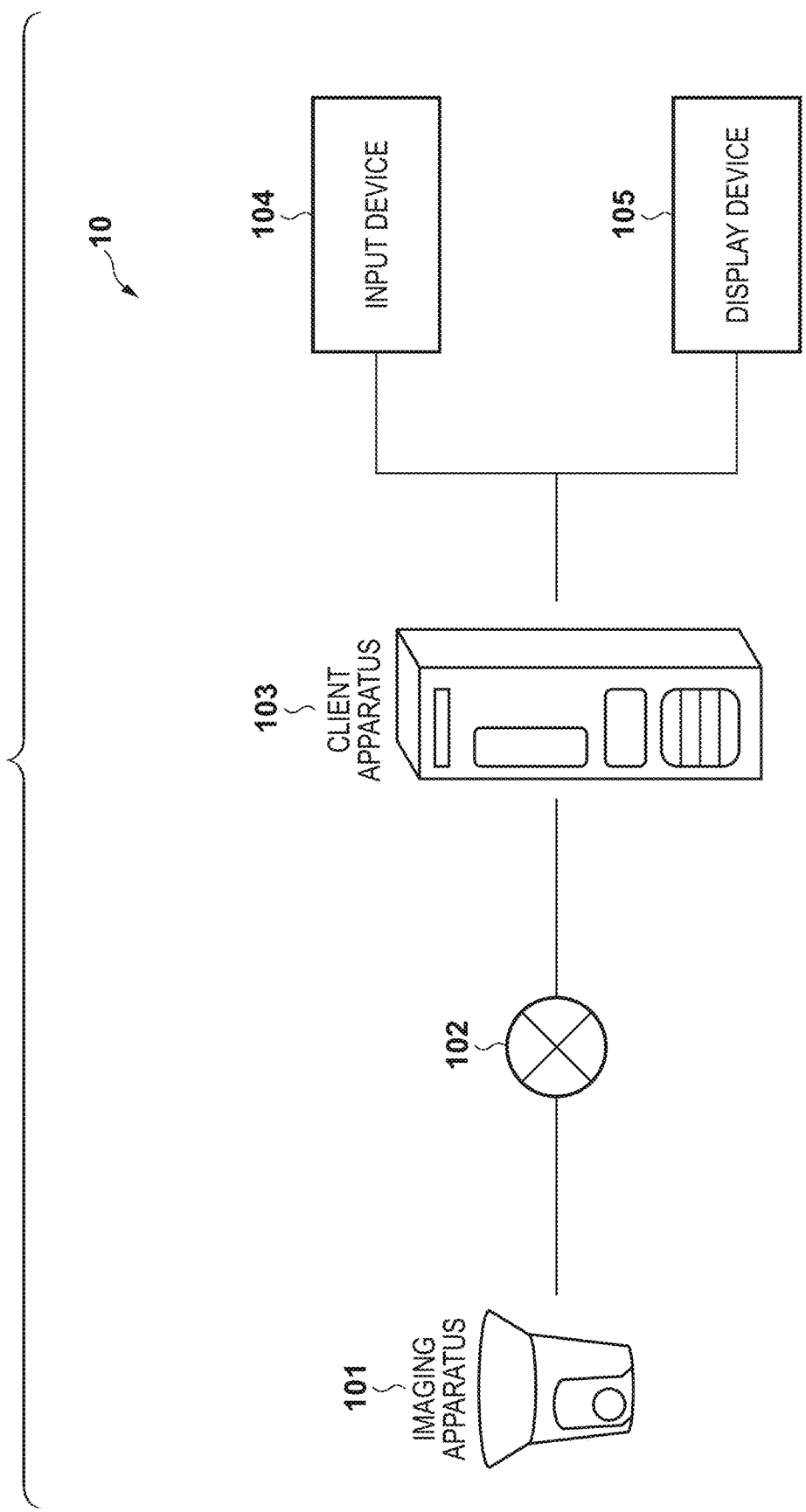
FIG. 1 is a block diagram illustrating an example of a configuration of an imaging control system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

Embodiment 1

One embodiment will be described below. FIG. 1 is a block diagram illustrating an example of a configuration of an imaging system 10 according to the present embodiment. The imaging system 10 illustrated in FIG. 1 includes an imaging apparatus 101 as a monitoring camera or a network camera for imaging and processing a moving image, a client apparatus 103 connected mutually in a communicable state via a network 102, an input device 104, and a display device 105.

Figure 2:
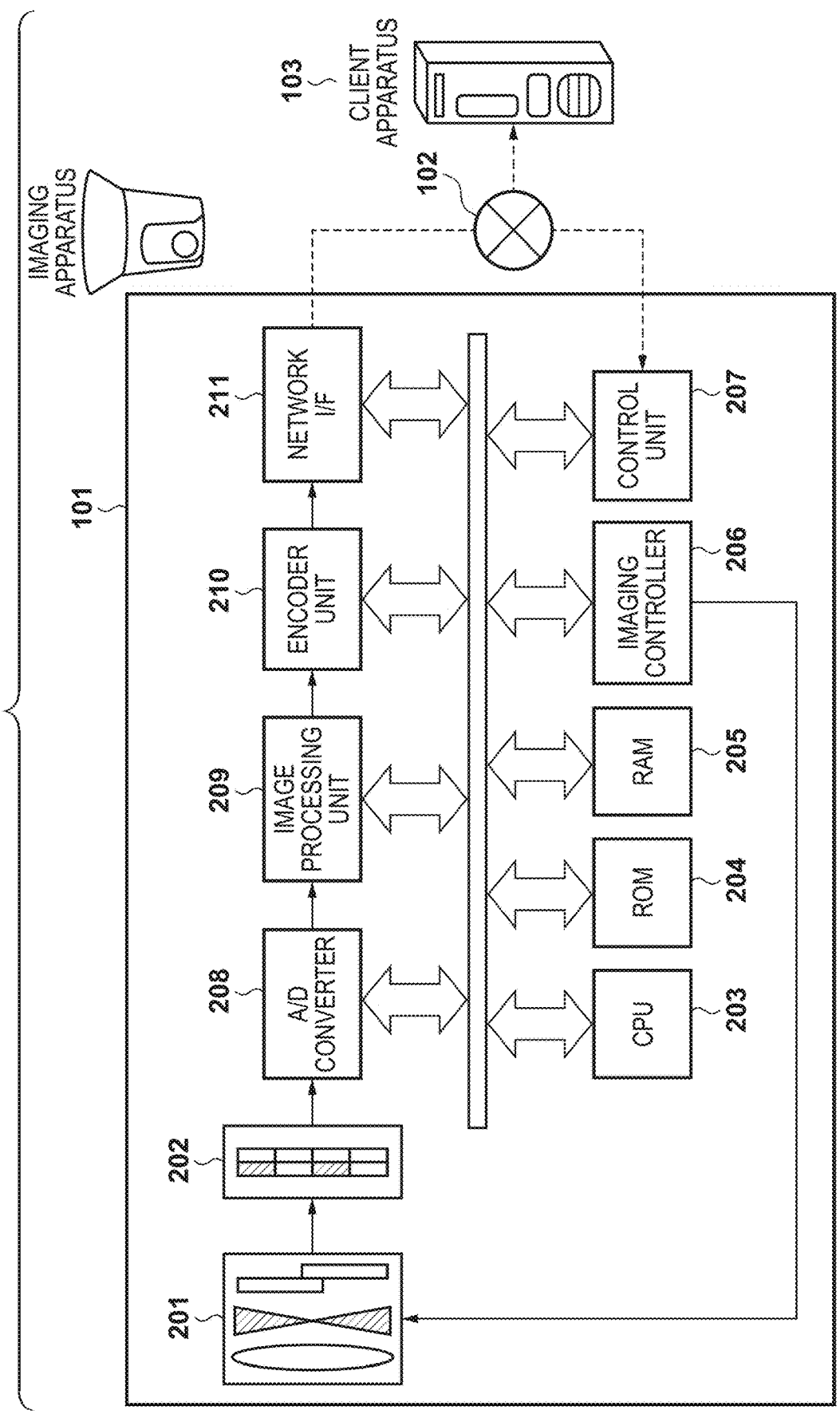
FIG. 2 is a block diagram illustrating an example of an internal configuration of an imaging apparatus 101 according to embodiments.

FIG. 2 is a block diagram illustrating an example of an internal configuration of the imaging apparatus 101 according to the present embodiment. An optical unit 201 includes a focus lens, a shake correction lens, a diaphragm, and a shutter, and collects light information of a subject. An image capturing unit 202 is an element to convert optical information collected by the optical unit 201 into a current value, and acquires color information by combining with a color filter or the like. Moreover, the image capturing unit 202 is an imaging sensor that can set an arbitrary exposure time for every pixel. A CPU 203 is involved in all of the processes of each configuration, sequentially reads and interprets instructions stored in a Read Only Memory (ROM) 204 and a Random Access Memory (RAM) 205, and executes processing according to the result.

An imaging controller 206 controls the optical unit 201 as instructed by the CPU 203 such as setting the focus, opening the shutter, and adjusting the diaphragm. A control unit 207 performs control in response to an instruction from the client apparatus 103. An A/D converter 208 converts the light quantity of the subject detected by the optical unit 201 into a digital signal value. An image processing unit 209 performs image processing on the image data of the digital signal described above. An encoder unit 210 converts the image data processed by the image processing unit 209 into a file format such as Motion Jpeg, H. 264 or H. 265. The data of a still image or a moving image generated by the conversion processing in the encoder unit 210 is provided as a "distribution image" to the client apparatus 103 via the network 102. A network I/F 211 is an interface used for communication with external apparatuses such as the client apparatus 103 via the network 102.

The network 102 is a network for connecting the imaging apparatus 101 and the client apparatus 103. The network 102 includes a plurality of routers, switches, cables, or the like, which satisfy a communication standard such as Ethernet (registered trademark). In the present embodiment, the network 102 may be any network that can perform communication between the imaging apparatus 101 and the client apparatus 103, regardless of the communication standard, scale, and configuration of the network. For example, the network 102 may include the Internet, a wired Local Area Network (LAN), a wireless LAN (Wireless LAN), a Wide Area Network (WAN), or the like.

FIG. 3 is a block diagram illustrating an example of an internal configuration of the client apparatus 103 according to the present embodiment. The client apparatus 103 includes a CPU 301, a main storage device 302, an auxiliary storage device 303, an input I/F 304, an output I/F 305, and a network I/F 306. Each element is communicatively connected mutually via a system bus. The client apparatus 103 can operate as an information processing apparatus, a setting apparatus for performing various settings of the imaging apparatus 101, a control apparatus, or the like.

The CPU 301 functions as a controller for controlling the operation of the client apparatus 103. The main storage device 302 is a storage device such as a RAM that functions as a temporary storage location for data of the CPU 301. The auxiliary storage device 303 is a storage device such as HDD, ROM, or SSD for storing various programs and various setting data or the like. The input I/F 304 is an interface used when receiving an input from the input device 104 or the like. The output I/F 305 is an interface used for outputting information to the display device 105 or the like. The network I/F 306 is an interface used for communication with an external device such as the imaging apparatus 101 via the network 102.

The CPU 301 reads out the various programs stored in the auxiliary storage device 303 to the main storage device 302 and executes the programs, thereby executing processing according to the present embodiment and controlling transmission and reception of various information to and from the imaging apparatus 101. Further, the CPU 301 receives an input from the input device 104 via the input I/F 304, and controls the display of images and various information on the display device 105 via the output I/F 305.

The input device 104 is an input device that includes a mouse, a keyboard, a touch panel, a button, or the like. The display device 105 is a display device such as a display monitor for displaying an image output from the client apparatus 103. In the embodiment, the client apparatus 103, the input device 104, and the display device 105 can be independent devices. In this case, for example, the client apparatus 103 may be configured as a personal computer (PC), and the input device 104 may be a mouse or a keyboard connected to the PC, and the display device 105 may be a display connected to the PC. Moreover, in addition to the present configuration, the client apparatus 103 and the display device 105 may be integrated, or the input device 104 and the display device 105 may be integrated like a touch panel. Additionally, the client apparatus 103, the input device 104, and the display device 105 may be integrated such as a smartphone or a tablet terminal.

Next, with reference to FIGS. 4 and 5, a specific example of the change and maintenance of the position of the photometry area, which is assumed after the viewing angle is changed by the enlarged display due to the digital zoom or the like after the setting of the area, will be described. In the imaging apparatus 101 of the present embodiment, when the photometry area is set to a dark area in the image, the CPU 203 brightly adjusts the exposure through the imaging controller 206 such that the dark area can be easily seen. Additionally, when the photometry area is set to a bright area, the CPU 203 darkens the exposure through the imaging controller 206 so as not to cause blown-out highlight.

First, with reference to FIG. 4, a case will be described in which a frame to be set as a photometry area is moved into the area of the distribution image when an enlarged display is performed using the digital zoom after the photometry area is designated. An image 400 in FIG. 4 illustrates a viewing angle of the camera with a building 401 in a distant, bright location and a hut 402 in a dark location in a forest in the right front. Here, first, when the subject of first interest is in the hut 402, a photometry area is set in the frame 403 in order to monitor the hut 402. Then, when the subject moves to the distant building 401, a case will be considered in which the zoom setting is performed to image the area indicated by the range 411 of the image 410 in FIG. 4B using a digital zoom. The distribution image at this time is illustrated in the image 420.

In this case, when photometry is performed while the photometry area remains at the position of the frame 403 in the image 400, blown-out highlight may occur. Therefore, it is desirable to move the photometry area to the peripheral position of the building 401 where the subject is present, not to keep the photometry area in the position of the frame 403. At this time, for example, when the photometry area is set to a frame 412 within a range 411 as illustrated in the image 410, the frame 412 is included in the distribution image.

Next, when the digital zoom is performed after the photometry area is designated, a case will be described with reference to FIG. 5 in which a frame to be set as a photometry area is kept at the position before the digital zoom. The image 500 of FIG. 5 illustrates a case in which the entrance is imaged from a room, but the room is dark and the light quantity at the entrance is large due to the influence of backlight or the like. The image 500 includes an entrance

501, a person 502 at the entrance, and a room 503. A strong light enters the entrance 501 due to a backlight. In this case, although the subject to be imaged is the person 502, when a photometry area is set inside the entrance 501, the entire image is darkened due to the strong light of the backlight. As a result, the entire image is too dark to properly view the person 502. Therefore, the photometry area can be designated at a position indicated by the frame 504, for example, in a dark part of the room 503. Then, a case will be considered in which a zoom setting is made to image an area indicated by the range 511 of the image 510 by using the digital zoom in order to view the subject in an enlarged manner. The distribution image at this time is illustrated in the image 520. Here, when the photometry area is moved within the frame 511 of the image 510, the above-described problem occurs, and the situation becomes inappropriate for observing the person 502. Therefore, under such a situation, it is desirable to maintain the photometry area at the position of the frame 504.

As described above, when the viewing angle of the distribution image is changed due to a digital zoom or the like, it is necessary to determine the position of the photometry area after changing the viewing angle according to the user's request or according to the environment or the situation during imaging.

In addition, the above description has been given of an area for which the position after changing the viewing angle becomes a problem in relation to the photometry area for determining the exposure among the imaging conditions of the imaging apparatus 101. However, the imaging conditions include, in addition to exposure, focus, white balance, or the like, and it is conceivable that the setting position becomes a problem also with respect to the area for measurement to control these conditions. Hereinafter, embodiments (including Embodiment 2) will be described using a photometry area as an example, but the contents described therein can be similarly applied to other measurement areas.

Figure 6A:
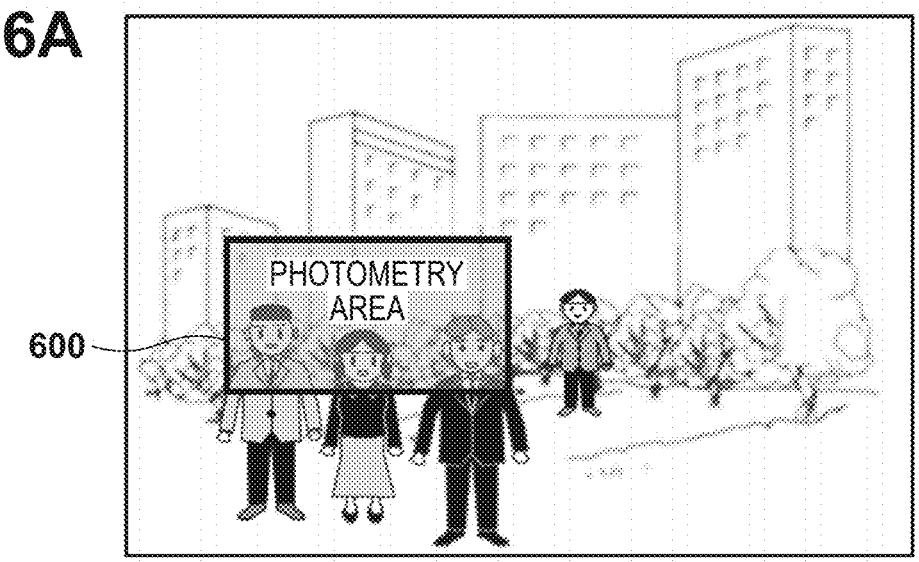
FIGS. 6A to 6C are explanatory diagrams respectively illustrating examples of various photometry modes in embodiments, that is, a custom photometry mode, a center-weighted photometry mode, and an evaluation photometry mode.

Next, the photometry mode in the present embodiment will be described with reference to FIG. 6. In the present embodiment, there are three kinds of photometry modes, which are a custom photometry mode, a center-weighted photometry mode, and an evaluation photometry mode. FIG. 6A illustrates an example of a custom photometry mode. In the custom photometry mode, a user designates a specific area (gray area) 600 at an arbitrary position in an image (viewing angle), performs photometry on the designated area, and adjusts an exposure amount. In this case, it is assumed that the monitoring target of the user exists in the designated specific area.

Figure 6B:
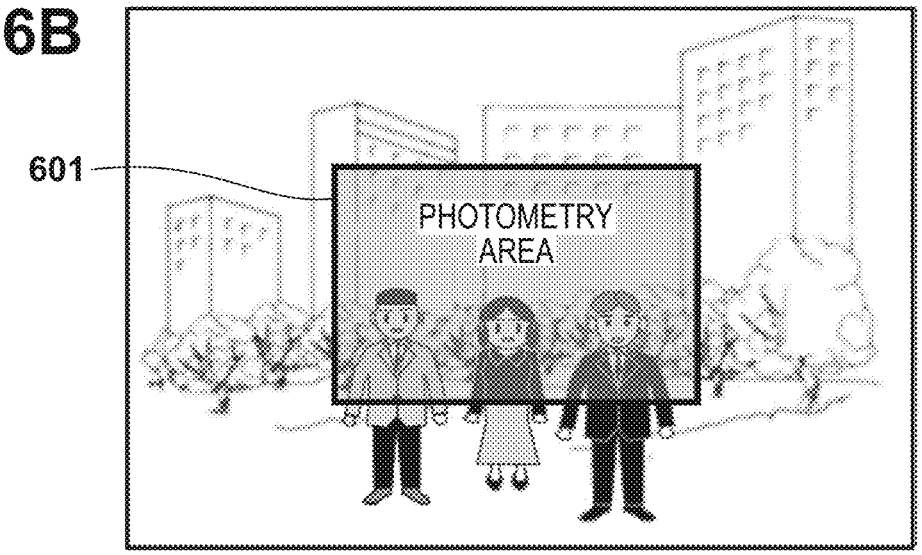
Figure 6C:
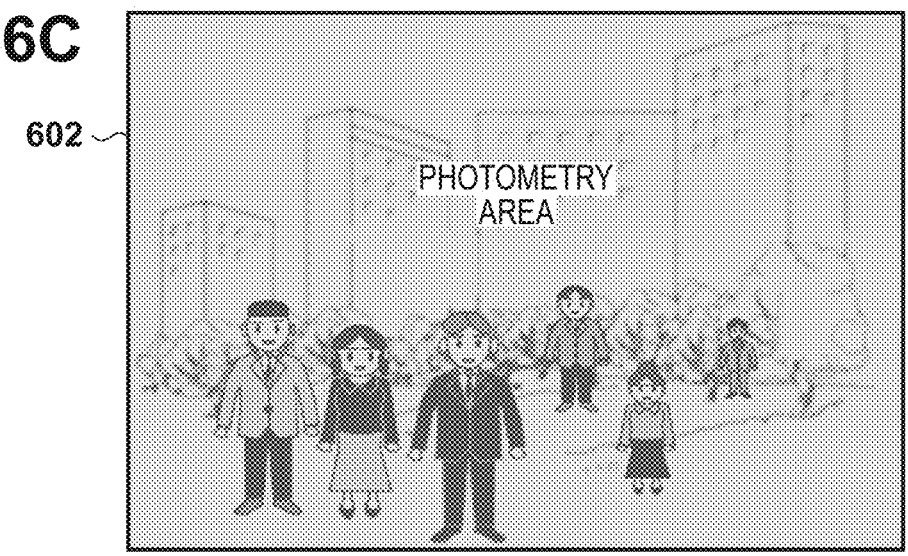

FIG. 6B illustrates an example of the center-weighted photometry mode. In the center-weighted photometry mode, photometry is performed by focusing on an area (gray area) 601 near the center of the image to adjust the exposure amount. In this case, it is assumed that the monitoring target of the user exists in the center of the screen. FIG. 6C illustrates an example of the evaluation photometry mode. In the evaluation photometry mode, photometry is performed with the whole screen (gray area) 602 as a photometry area to adjust the exposure amount. In this case, it is assumed that the monitoring target of the user exists in the entire screen.

Figure 7A:
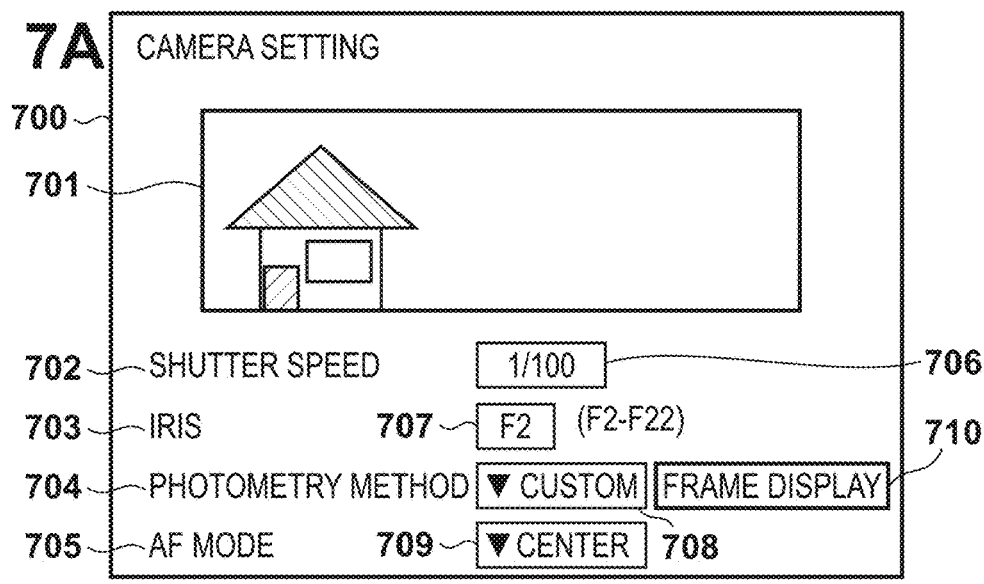
FIGS. 7A to 7C are explanatory diagrams illustrating an example of a setting method for the imaging apparatus 101 according to an embodiment.

Next, with reference to FIGS. 7A to 7C, a method of setting imaging conditions for the imaging apparatus 101 according to the present embodiment will be described. FIG. 7A illustrates an example of a setting screen of the imaging apparatus 101 according to the present embodiment. The setting screen 700 is displayed by downloading and executing a program from the imaging apparatus 101 when "camera setting" is selected on the setting top page (not illustrated) in the client apparatus 103. The setting screen 700 includes an area 701 for displaying the current distribution image. The setting values 706 to 709 are respectively displayed for the setting items 702 to 705. These are sent from the client apparatus 103 to the imaging apparatus 101 and reflected in the control. However, in the present embodiment, the photometry method is mainly described, and other setting items are omitted.

As for the items of the photometry method 704, any one of the 3 kinds of mode, which are the custom photometry mode, the center-weighted photometry mode, and the evaluation photometry mode described with reference to FIGS. 6A to 6C, can be set. For example, the center-weighted photometry mode or the evaluation photometry mode may be set by default. FIG. 7A illustrates a state in which the custom photometry mode is selected as an example. When the custom photometry mode is selected, a frame display button 710 is enabled and a user can operate the frame display button 710. For example, the user can perform operation input by clicking the button. Further, when the center-weighted photometry mode or the evaluation photometry mode is selected, the frame display button 710 may be grayed out so as not to accept the operation.

Figure 7B:
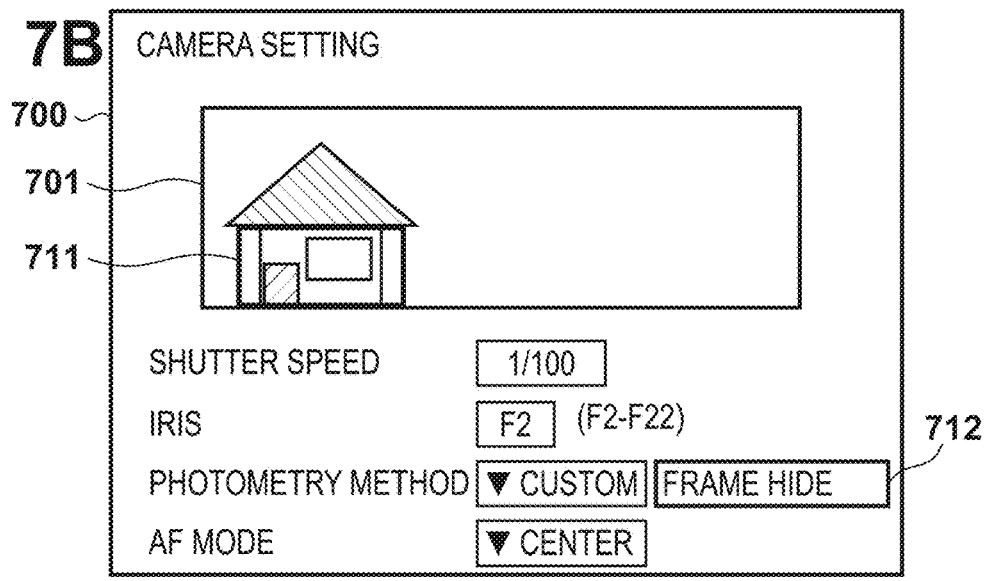
Figure 7C:
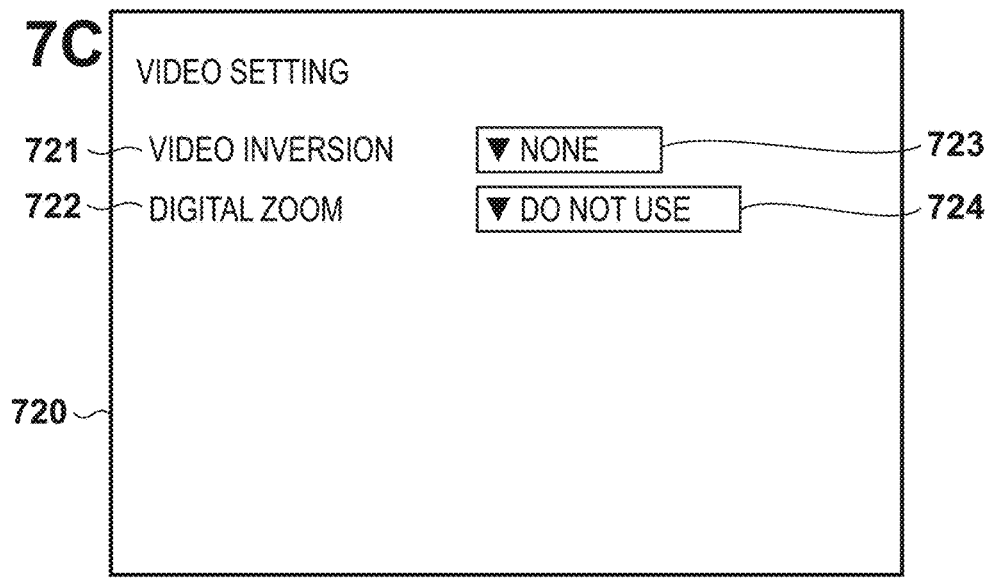

FIG. 7B illustrates an example of the display of the setting screen 700 after the frame display button 710 of FIG. 7A is operated. The difference from the setting screen 700 of FIG. 7A is that the frame 711 is displayed in the area 701 so as to be superimposed on the area for displaying the distribution image, and that the frame display button 710 is changed to a frame hide button 712.

First, the frame 711 is illustrated in a rectangular shape, and its size can be changed by clicking and dragging any vertex. The frame 711 can be freely moved within the area 701 by clicking, dragging and dropping the inside of the frame 711. By these operations, the user can arbitrarily change the position and size of the photometry area in the custom photometry mode. Additionally, when the frame 711 is displayed, the frame hide button 712 is displayed instead of the frame display button 710, and the display of the frame 711 can be erased from the area 701 by operating the frame hide button 712. When the value of the position and the size of the frame in the area 701 is changed as coordinate information, the value is sent from the client apparatus 103 to the imaging apparatus 101, so that the latest value is always reflected in the control.

Next, the video setting of the imaging apparatus 101 of the present embodiment will be described with reference to FIG. 7C. The setting screen 720 is a setting screen for setting whether to perform video inversion and digital zoom. The screen is displayed by downloading and executing a program from the imaging apparatus 101 when "video setting" is selected on the setting top page (not illustrated) in the client apparatus 103.

There are video inversion 721 and digital zoom 722 as setting items, for which setting values 723 and 724 are displayed respectively. These items are sent from the client apparatus 103 to the imaging apparatus 101 and reflected in the control. However, in the present embodiment, the digital zoom is mainly described, and the description of the video inversion is omitted.

The setting value 724 of the digital zoom 722 can be selected from, for example, "not used", "1.5 times", and "2 times". However, these enlargement magnifications are examples, and a more detailed enlargement magnification may be set, or the maximum magnification may be larger than 2. The imaging apparatus 101 multiplies these zoom values by 10 when there is an inquiry from the client apparatus 103, and then the multiplied result, which is "10" in the case of "not used", "15" in the case of "1.5 times", and "20" in the case of "2 times", is answered. In FIG. 7C, description has been made using the term "digital zoom", which generally refers to a process of extracting a part of a captured image and complementing and enlarging it by image processing. The processing is not limited to the name of digital zoom because the processing is in addition to "digital zoom" sometimes called by another name such as "tele-converter".

Next, the relationship between the position of the frame of the photometry area and the distribution image according to the digital zoom setting described in FIG. 7C will be described with reference to FIG. 8. First, FIG. 8A illustrates an example in which the photometry area is set in the custom photometry mode when the digital zoom is set to "not used". At this time, it can be seen that the frame 802 is set as a photometry area with respect to the viewing angle 801, and that the vicinity of the door on the right side is the photometry area. FIGS. 8B and 8C illustrate an example of the relationship between the viewing angle and the photometry area when the setting of the digital zoom is changed from "not used" to "1.5 times" in the setting screen 720 of FIG. 7C in this setting. The distribution image is zoomed as illustrated by the viewing angle 803 in FIG. 8B. At this time, the frame 802 corresponding to the photometry area is located within the distribution image. FIG. 8C illustrates the relationship among the viewing angle 801, the frame 802, and the viewing angle 803 in the state where FIG. 8B is distributed. The display range in the display area 701 corresponds to the viewing angle 803 with respect to the original viewing angle 801. At this time, the frame 802 is included in the display range, and therefore is displayed in the area 701.

Next, when the enlargement magnification of the digital zoom is further increased by 2, the distribution image changes as illustrated by the viewing angle 804 in FIG. 8D. At this time, the frame 802 corresponding to the photometry area is out of the distribution image displayed in the area 701. FIG. 8E illustrates the relationship among the viewing angle 801, the frame 802, and the viewing angle 804 in the state where FIG. 8D is distributed. The display range in the display area 701 corresponds to the viewing angle 804 with respect to the original viewing angle 801. At this time, the frame 802 is out of the display range, and therefore is not displayed on the area 701.

FIG. 8F is a view illustrating viewing angles 801, 803 and 804 by coordinate information, according to the magnification of the digital zoom. The viewing angle 801 when the digital zoom is not used is set as an area of 1920×1080. However, this numerical value is merely an example, and this value is set regardless of the viewing angle of the distribution. The coordinate system to be applied is an XY coordinate system with origin (0, 0) at the upper left, and horizontal 1920 and vertical 1080 being the maximum. When in the coordinate system the digital zoom is "not used", "1.5 times", and "2 times", the information indicating the size and display position of the distribution image to be displayed in the area 701 of the setting screen 700 is respectively "upper left coordinate (0, 0), lower right coordinate (1920, 1080)", "upper left coordinate (320, 180), lower right coordinate (1600, 900)", and "upper left coordinate (480, 270), lower right coordinate (1440, 810)".

When receiving an inquiry about the position of the frame from the client apparatus 103, the imaging apparatus 101 returns the coordinates with respect to the entire image 1920×1080 as position information. Thus, it can be determined whether the position of the acquired frame is included in the display range of the area 701, and when it is not included in the display range, it can be determined that the frame is located outside the distribution image.

Next, with reference to FIG. 9, processing in the present embodiment when the photometry area is located outside the display range due to the digital zoom setting will be described. Here, as illustrated in FIG. 8D, the case where the frame 802 is out of the display range corresponding to the viewing angle 804 when the magnification of the digital zoom is set to 2 will be described as an example. Since the setting screen illustrated in FIG. 9 corresponds to the setting screen illustrated in FIG. 7, the corresponding reference numeral is used.

Figure 9A:
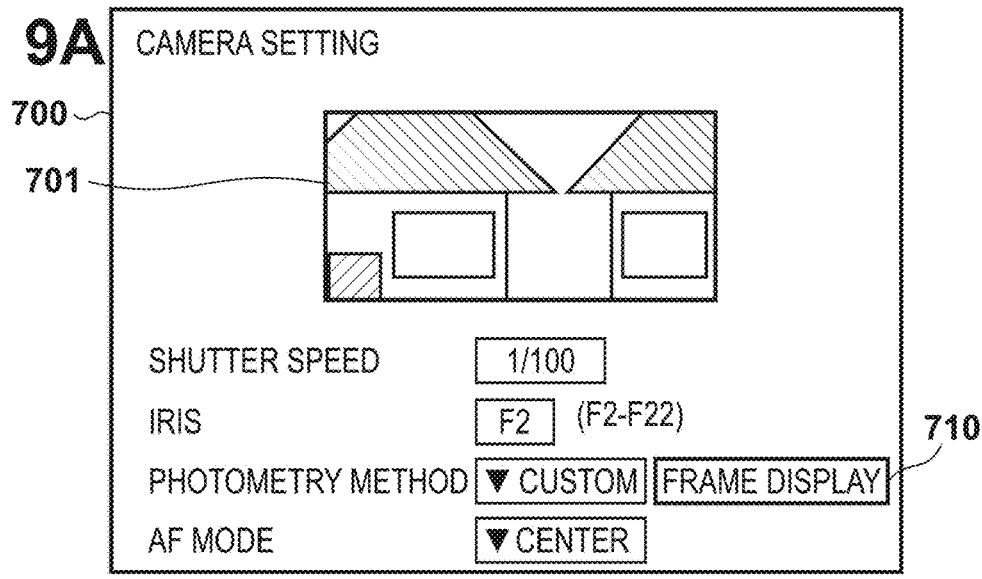
FIGS. 9A to 9E are explanatory diagrams of an example of processing in a case where a photometry area is located outside a display range due to a setting of a digital zoom according to an embodiment.
Figure 9B:
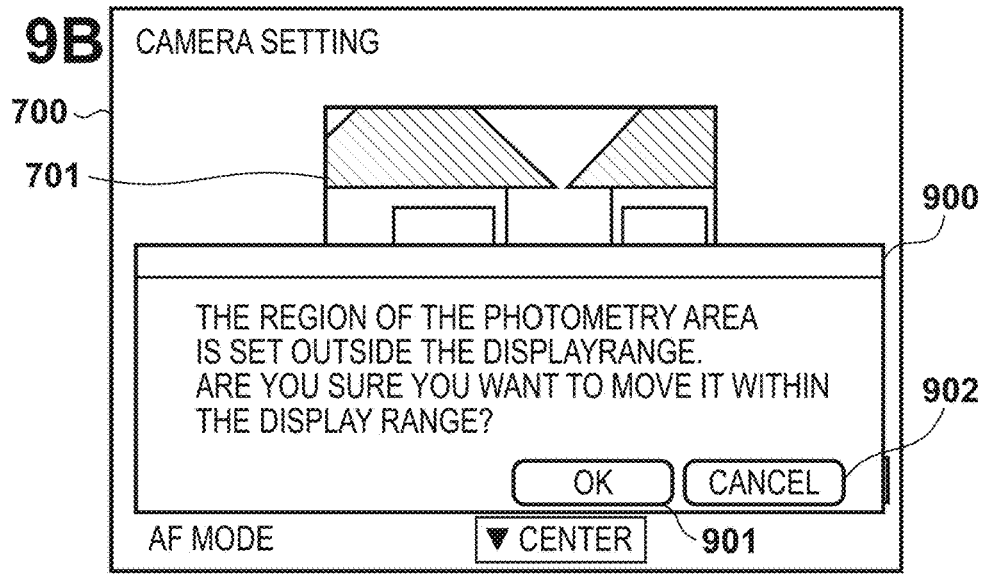

In FIG. 9A, an image (corresponding to FIG. 8D) imaged by a digital zoom of 2 times is displayed in an area 701 as a distribution image. At this time, when the frame display button 710 is operated, a frame corresponding to the photometry area is displayed in the area 701, but in this case, the frame cannot be displayed because the frame is not included in the distribution image displayed in the area 701. Therefore, a message display screen 900 as illustrated in FIG. 9B is superimposed on the setting screen 700 (popup display).

Figure 9C:
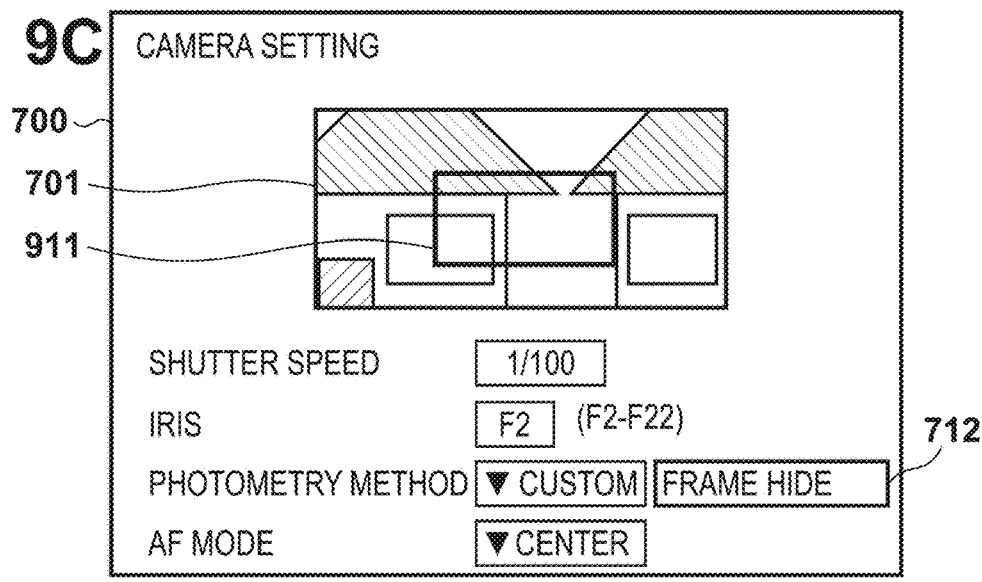
Figure 9D:
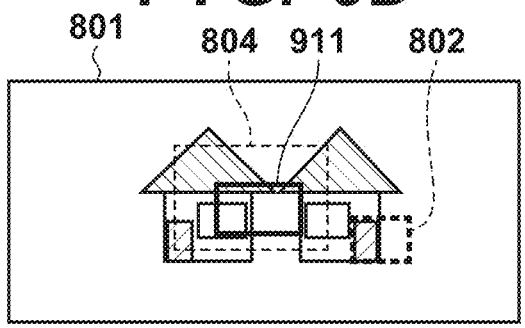
Figure 9E:
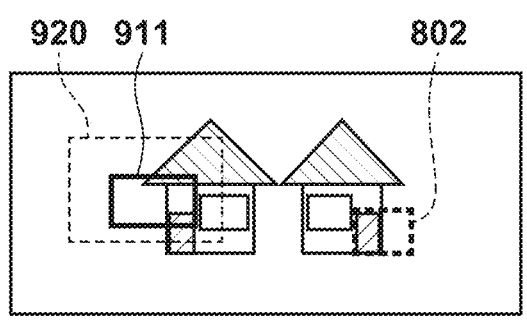

On a message display screen 900, an OK button 901 and a cancel button 902 are displayed together with the message "The region of the photometry area is set outside the display range. Are you sure you want to move it within the display range?" to the user. When the user selects the OK button 901, the frame corresponding to the photometry area is moved to the distribution image as illustrated in FIG. 9C. In FIG. 9C, a frame 911 is displayed near the center of the area 701. As illustrated in FIG. 9D, the photometry area at this time is moved from the position of the original frame 802 to the frame 911 within the display range corresponding to the viewing angle 804. Further, the frame display button 710 is changed to a frame hide button 712. When the digital zoom is used to zoom another area of the image, for example, the area indicated by the frame 920 as illustrated in FIG. 9E, instead of the image in the center of the screen, the photometry area is moved to fit within the frame 920. At this time, the photometry area may be moved so as to be positioned at the center of the frame 920, and then the user may further change the position of the photometry area.

In addition, although, according to the above, the message display screen 900 is displayed when the photometry area is out of the display range, the display of the message display screen 900 may be suppressed when the brightness difference is large by comparing the brightness of the area before and after the change. This is effective when, as described with reference to FIG. 5, the photometry area is moved into the distribution image after the digital zoom and therefore there is a possibility that the entire image may become dark due to the strong light of the backlight. In this case, instead of the message display screen 900, a message such as "The region of the photometry area is set outside the display range, but the photometry area is not moved in order to maintain the current display state." can be displayed. On the display screen of the message, only the OK button may be displayed to obtain confirmation from the user. When the OK button is operated, the screen disappears from the setting screen 700 and returns to the display state of FIG. 9A with the setting contents maintained.

On the other hand, when the user selects the cancel button 902, the position of the frame is left unchanged, the message display screen 900 disappears from the setting screen 700, and the display state of FIG. 9A is maintained. In this case, the setting content does not change at all, and only the popup screen disappears. The frame display button 710 also remains a button for displaying a frame, and when the frame display button 710 is operated again, the message display screen 900 of FIG. 9B is displayed again.

In the present embodiment, the message display screen 900 is popup displayed so that the user can select (designate) whether to move the photometry area into the distribution image or to leave it as it is. However, the embodiment is not limited to this, and a UI such as a change button for instruction of changing (returning) the display position of the frame corresponding to the photometry area to the distribution image may be provided in the setting screen 700. In this case, since the frame is not displayed even when the user operates the frame display button 710, the position of the photometry area can be changed in the distribution image by operating the change button. For example, when the frame display button 710 is enabled, the frame is displayed when the change button is operated.

Next, an example of processing executed by the client apparatus 103 according to the present embodiment will be described with reference to the flow chart of FIG. 10. The present processing is started when the camera setting screen described with reference to FIG. 7 or the like is displayed. In the following, among the processing executed by the client apparatus 103, processing related to the display of a frame indicating a photometry area will be described in particular. The processing corresponding to the flow chart is implemented, for example, by the CPU 301 reading out a program stored in the auxiliary storage device 303 to the main storage device 302 and executing the program.

First, in S1001, the CPU 301 acquires zoom information set in the imaging apparatus 101. Specifically, the CPU 301 requests zoom information from the imaging apparatus 101 via the network I/F 306. The control unit 207 of the imaging apparatus 101 transmits zoom information to the client apparatus 103 via the network I/F 211 in response to the request. At this time, the zoom information is returned with a value of 10 when the digital zoom is not used, 15 when the digital zoom is 1.5 times, and 20 when the digital zoom is 2 times. The CPU 301 determines the digital zoom magnification from the value indicated by the received zoom information.

In a subsequent S1002, the photometry method and the position information of the frame are acquired from the imaging apparatus 101. The acquisition method is the same as in S1001. As the information to be acquired, whether the photometry mode is a custom photometry mode, a center-weighted photometry mode or an evaluation photometry mode is acquired, and in the case of a custom photometry mode, position information of a frame corresponding to a photometry area is acquired. For the other 2 modes, when the position of the photometry area is predetermined, the position information of the frame may be held on the client apparatus 103 side and used.

In a subsequent S1003, the CPU 301 determines whether the frame display button 710 displayed on the setting screen 700 has been operated. When it is determined that the frame display button 710 is not operated, the determination is continued. When it is determined that the frame display button 710 has been operated, the processing proceeds to S1004.

In S1004, the CPU 301 determines whether the position of the photometry area is included within the display range of the image in the area 701. This determination is made based on the zoom information acquired in S1001 and the position of the photometry area acquired in S1002. For example, when the digital zoom of 2 times is performed, as illustrated in FIG. 8F, the display range in the area 701 is from (480,270) to (1440,810) in the 1920×1080 area. Therefore, the CPU 301 determines whether the position information of the photometry area is included in the display range. At this time, the CPU 301 can determine that the photometry area is outside the display area in even a case where any one of the 4 corners of the photometry area is outside the display range.

When it is determined in S1004 that the photometry area is within the display range, the processing proceeds to S1009, in which a frame indicating the photometry area is superimposed and displayed on the image in the area 701 at a position corresponding to the currently set photometry area. On the other hand, when it is determined that the photometry area is not included in the display range, the processing proceeds to S1005. In S1005, the CPU 301 displays the message display screen 900 on the setting screen 700. The display state at this time is as illustrated in FIG. 9B. In a subsequent S1006, the CPU 301 determines whether the operation of the OK button 901 has been received. When it is determined that the operation of the OK button 901 is received, the processing proceeds to S1008. In S1008, the position of the photometry area is changed to the display area as illustrated in FIG. 9C, and in a subsequent S1009, a frame indicating the photometry area is displayed in the area 701. At this time, a new position information of the photometry area is notified to the imaging apparatus 101 and set.

On the other hand, when the CPU 301 determines that the OK button 901 is not operated, the processing proceeds to S1007 to determine whether the cancel button 902 is operated. When it is determined that the cancel button 902 is operated, the display on the message display screen 900 is erased, and the processing returns to S1003. On the other hand, when it is determined that the cancel button 902 is not operated, the processing returns to S1006.

In S1009, the CPU 301 displays a frame in the area 701. In a subsequent S1010, the CPU 301 determines whether the frame hide button 712 has been operated. When it is determined that the frame hide button 712 is operated, the processing proceeds to S1011, and when it is determined that the frame hide button 712 is not operated, the determination in S1010 is repeated. When the frame is moved or enlarged while the processing in S1010 is repeated, the CPU 301 notifies the imaging apparatus 101 of the position information of the new frame and performs setting. In S1011, the CPU 301 erases the display of the frame in the area 701. Thereafter, the processing returns to S1003.

Figure 10:
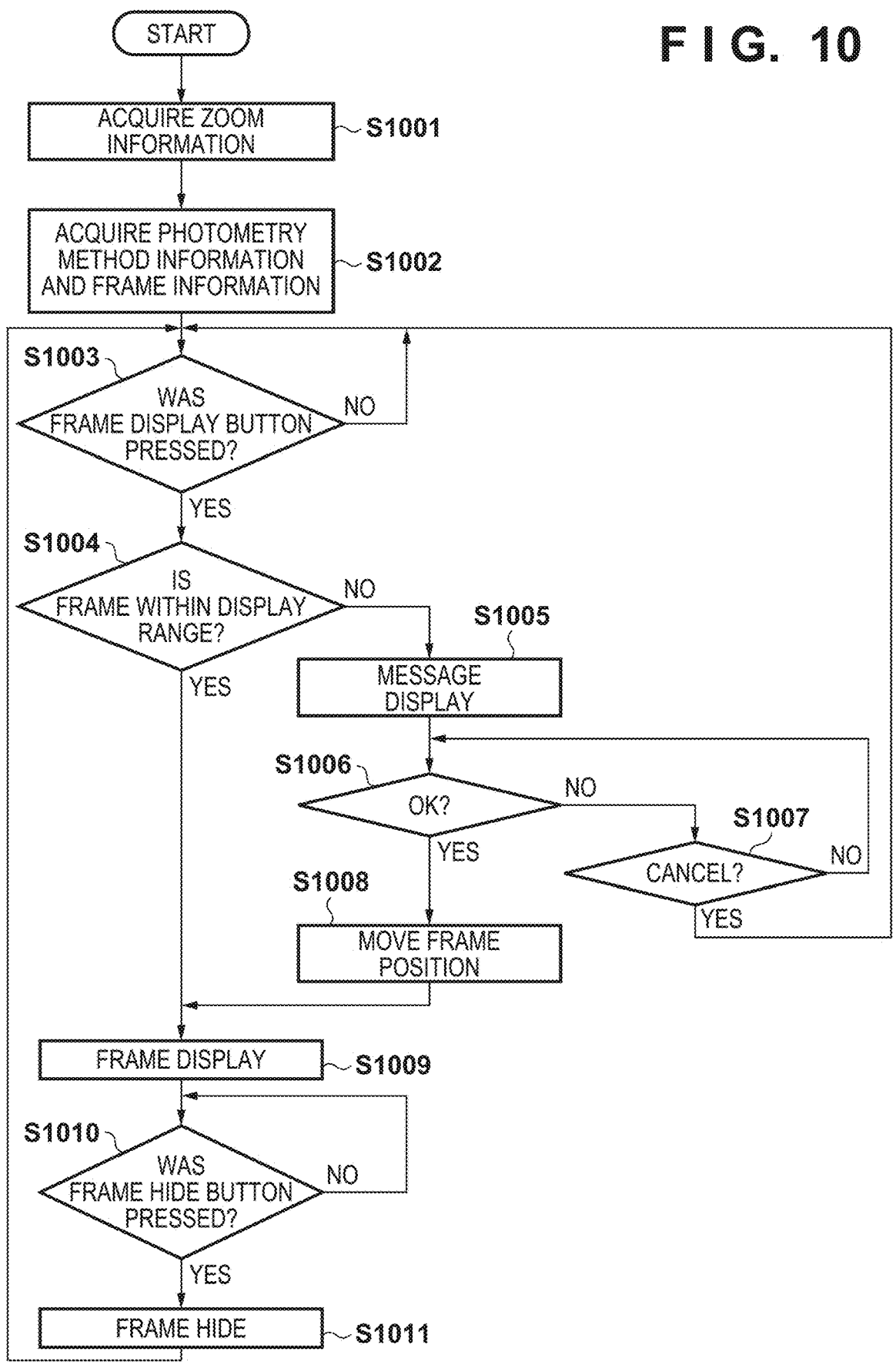
FIG. 10 is a flow chart illustrating an example of processing in the client apparatus 103 corresponding to Embodiment 1.

In FIG. 10, the case where the zoom information and the frame information are acquired in S1001 and S1002 is described, but these pieces of information may be acquired on the way. In this case, the determination in S1004 is made based on the latest acquired information.

When it is determined in S1004 that the position of the frame is not included in the display range, a further determination may be made before proceeding to S1005. Specifically, when the setting position of the photometry area is changed so as to be included in the display range, it is possible to further determine whether there exists an influence on the display state of the image displayed in the area 701. The determination can be based on the brightness difference between the area before and after the change of the setting position of the frame is larger than a predetermined value (threshold). In this case, when the brightness difference is smaller than the threshold, it is determined that there is no influence on the display image even after the setting position is changed, and the processing from S1005 in FIG. 10 is performed. On the other hand, when the brightness difference is not less than the threshold, the message in S1005 is changed to the message "The region of the photometry area is set outside the display range, but the photometry area is not moved in order to maintain the current display state." because the change in the setting position affects the display image, and the processing may be returned to S1003.

As described above, in the present embodiment, when it is found that the photometry area is located outside the distribution image as a result of the digital zoom, the user can select whether to maintain the position of the photometry area as it is or to change the position of the photometry area into the distribution image, or the client apparatus 103 can determine. Thus, the photometry area can be set in accordance with the needs of the user and the imaging environment.

Embodiment 2

Embodiment 2 will be described below. In the present embodiment, another display form when the photometry area is not located in the distribution image will be described. Since the system configuration and the processing executed in the present embodiment are the same as those in Embodiment 1, description thereof will be omitted.

FIG. 11 is a view for explaining a display form of the setting screen 700 according to the present embodiment. FIG. 11A is similar to FIG. 9A and is illustrated here for comparison with FIG. 11B. FIG. 11B illustrates an example of a display form when the frame display button 710 is operated in the display state of FIG. 11A.

In FIG. 11B, the distribution image 1101 is displayed in a size corresponding to the ratio to the viewing angle (1920×1080) when the digital zoom is not used in the area 701. Since the periphery 1102 of the distribution image 1101 is not a display object, it is displayed in a form distinguishable from the image 1101. The frame 1103 is a frame corresponding to the photometry area, and thereby, the position of the present photometry area can be grasped in relation to the distribution image 1101 or the display range of the entire image in the area 701. By operating (moving, scaling) the displayed frame 1103, it is possible to change/maintain the setting of the photometry area or move the photometry area into the display area. In this display state, when the frame hide button 712 is operated, the display state of FIG. 11A is returned.

In FIG. 11B, the area 1102 is hatched without displaying an image, but the display form is not limited to this. For example, an image before digital zoom may be stored in the imaging apparatus 101 or the client apparatus 103, and the image may be used after zoom.

Figure 12:
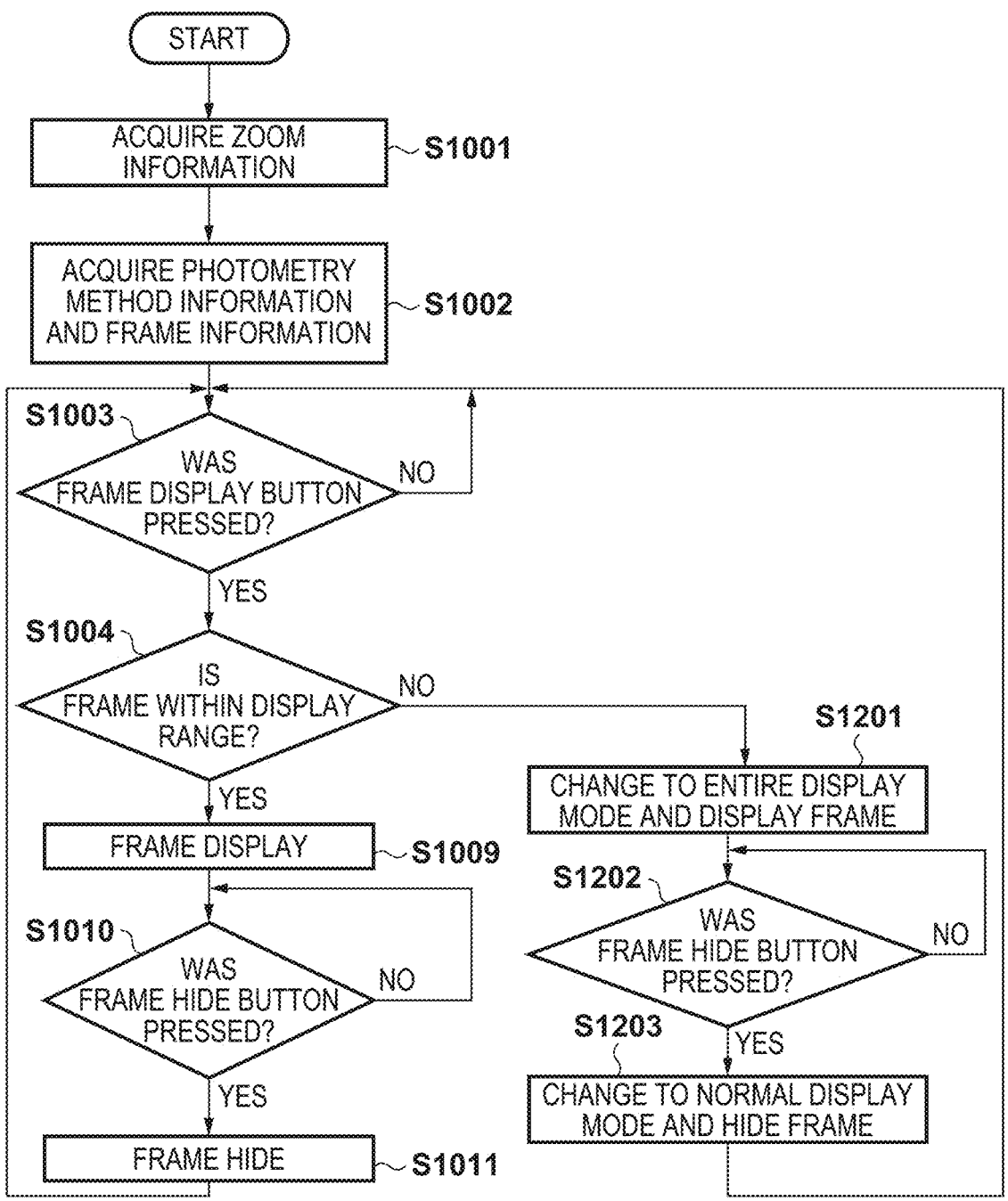
FIG. 12 is a flow chart illustrating an example of processing in the client apparatus 103 corresponding to Embodiment 2.

Next, the processing of the client apparatus 103 according to the present embodiment will be described with reference to the flow chart of FIG. 12. In the flow chart illustrated in FIG. 12, a part of the processing is the same as that illustrated in the flow chart illustrated in FIG. 10, and therefore, corresponding reference numerals are given to that part, and descriptions thereof are omitted. The present processing is also started when the camera setting screen described with reference to FIG. 7 or the like is opened. In the following, among the processing executed by the client apparatus 103, processing related to the display of a frame indicating a photometry area will be described in particular. The processing corresponding to the flow chart is implemented, for example, by the CPU 301 reading out a program stored in the auxiliary storage device 303 to the main storage device 302 and executing the program.

In S1004, when the CPU 301 determines that the frame corresponding to the photometry area is not within the display range, the processing proceeds to S1201. In S1201, the CPU 301 changes the distribution image on the setting screen 700 to the entire display mode in which the distribution image is displayed in the coordinate reference of the entire image not using the digital zoom as illustrated in FIG. 11B, and displays the frame in the area 701. In a subsequent S1202, the CPU 301 determines whether the frame hide button 712 has been operated. When it is determined that the frame hide button 712 is operated, the processing proceeds to S1203, and when it is determined that the frame hide button 712 is not operated, the determination in S1202 is repeated. When the frame is moved or enlarged while the processing in S1202 is repeated, the CPU 301 notifies the imaging apparatus 101 of the position information of the new frame and performs setting. In S1203, the CPU 301 displays only the distribution image corresponding to the magnification of the digital zoom in the area 701 and erases the display of the frame so as to return the display form to the normal display mode illustrated in FIG. 11A. Thereafter, the processing returns to S1003.

As described above, also in the present embodiment, when it is found that the photometry area is located outside the distribution image as a result of the digital zoom, the user can select whether to maintain the position of the photometry area as it is or to change the position thereof into the distribution image, or the client apparatus 103 can determine. Thus, the photometry area can be set in accordance with the needs of the user and the imaging environment.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-117716, filed on Jun. 25, 2019, which is hereby incorporated by reference herein in its entirety.

What is claimed is:

1. An information processing apparatus, comprising:
a memory that is coupled to at least one processor and stores one or more computer-readable instructions, wherein the computer-readable instructions cause, when executed by the at least one processor, the at least one processor to function as:
  a display control unit configured to display, in a display area of a display device, an image captured by an imaging apparatus;
  an area designation unit configured to designate an area for the image displayed in the display area;
  a determination unit configured to determine whether a position of the designated area is outside the display area as a result of enlarging and displaying a part of the image displayed in the display area;
  a notification unit configured to notify, when a determination is made such that the position of the designated area is outside the display area, of the determination; and
  a receiving unit configured to receive an instruction about whether to move the position of the designated area into the display area when the determination unit determines that the position of the designated area is outside the display area.

2. The information processing apparatus according to claim 1, wherein,
when the determination unit determines that the position of the designated area is outside the display area, the notification unit notifies that the position of the designated area is outside the display area before the receiving unit receives the instruction.

3. The information processing apparatus according to claim 1, wherein,
when the determination unit determines that the position of the designated area is outside the display area, and when the receiving unit receives a first instruction for moving the position of the designated area into the display area, the display control unit displays, in the display area, information indicating the area.

4. The information processing apparatus according to claim 3, wherein
the receiving unit further receives a second instruction for causing the display device to display the information indicating the area, and
the determination unit makes the determination in response to receiving the second instruction.

5. The information processing apparatus according to claim 3, wherein
the receiving unit further receives a second instruction for causing the display device to display the information indicating the area, and
in response to receiving of the second instruction, the display control unit changes a display form of the image in the display area from a display form that occupies the display area entirely to a display form that displays the image in the display area in a size corresponding to an enlargement magnification in the enlarging and displaying, and displays, in the display area, the information indicating the area.

6. The information processing apparatus according to claim 4, wherein
the receiving unit further receives a third instruction for erasing, from the display device, the display of the information indicating the area, and
the display control unit erases, from the display device, the display of the information indicating the area in response to the receiving of the third instruction by the receiving unit.

7. The information processing apparatus according to claim 1, wherein,
when the determination unit determines that the position of the area is outside the display area, the determination unit further determines whether there exists an influence on a display state of the image displayed in the display device, due to changing the position of the area such that the position is within the display area, and
when the determination unit determines that the influence exists, the receiving unit does not receive the instruction about whether to move the position of the area into the display area.

8. The information processing apparatus according to claim 7, wherein
the determination unit compares, with a threshold, a difference between brightness of the image at the position of the area and the brightness of the image at the position when the position of the area is moved into the display area, and determines that the influence exists when the difference is not less than the threshold.

9. The information processing apparatus according to claim 1, wherein
the determination unit determines whether the position of the designated area is outside the display area based on an enlargement magnification of the enlarging and displaying.

10. The information processing apparatus according to claim 1, wherein
the designated area by the area designation unit is an area for measurement that is performed by the imaging apparatus to determine an imaging condition, and
the imaging condition includes at least one of exposure, focus, and white balance.

11. A system comprising:
an information processing apparatus that includes a memory that is coupled to at least one processor and stores one or more computer-readable instructions, wherein the computer-readable instructions cause, when executed by the at least one processor, the at least one processor to function as:
  a display control unit configured to display, in a display area of a display device, an image captured by an imaging apparatus;
  an area designation unit configured to designate an area for an image displayed in the display area;
  a determination unit configured to determine whether a position of the designated area is outside the display area as a result of enlarging and displaying a part of the image displayed in the display area; and
  a notification unit configured to notify, when a determination is made such that the position of the designated area is outside the display area, of the determination; and
the imaging apparatus configured to communicate with the information processing apparatus to receive a setting of an imaging condition and transmit, to the information processing apparatus, the image captured based on the setting.

12. A control method of an information processing apparatus, comprising:
- displaying, in a display area of a display device, an image captured by an imaging apparatus;
- designating an area for the image displayed in the display area;
- determining whether a position of the designated area is outside the display area as a result of enlarging and displaying a part of the image displayed in the display area;
- notifying, when a determination is made such that the position of the designated area is outside the display area, of the determination; and
- receiving an instruction about whether to move the position of the designated area into the display area when, in the determining, a determination is made such that the position of the designated area is outside the display area.

13. The control method of an information processing apparatus according to claim 12, wherein,
- when, in the determining, the determination is made such that the position of the designated area is outside the display area, a notification, in the notifying, is made such that the position of the designated area is outside the display area before the instruction is received in the receiving.

14. The control method according to claim 12, wherein,
- when, in the determining, the determination is made such that the position of the designated area is outside the display area, and when, in the receiving, a first instruction for moving the position of the designated area into the display area is received, information indicating the area is displayed in the display area, in the displaying.

15. The control method according to claim 14, wherein,
- in the receiving, a second instruction for causing the display device to display information indicating the area is further received, and
- in the determining, the determination is made in response to receiving of the second instruction.

16. The control method according to claim 14, wherein,
- in the receiving, a second instruction for causing the display device to display information indicating the area is further received, and
- in the displaying, in response to receiving of the second instruction, a display form of the image in the display area is changed from a display form that occupies the display area entirely to a display form that displays the image in the display area in a size corresponding to an enlargement magnification in the enlarging and displaying, and the information indicating the area is displayed in the display area.

17. The control method according to claim 15, wherein,
- in the receiving, a third instruction for erasing, from the display device, the display of the information indicating the area is further received, and
- in the displaying, the display of the information indicating the area is erased from the display device in response to the receiving of the third instruction in the receiving.

18. A non-transitory computer-readable storage medium storing one or more programs including instructions that, when executed by a processor of an information processing apparatus, cause the processor to perform operations of:
- displaying, in a display area of a display device, an image captured by an imaging apparatus;
- designating an area for the image displayed in the display area;
- determining whether a position of the designated area is outside the display area as a result of enlarging and displaying a part of the image displayed in the display area;
- notifying, when a determination is made such that the position of the designated area is outside the display area, of the determination; and
- receiving an instruction about whether to move the position of the designated area into the display area when, in the determining, the determination is made such that the position of the designated area is outside the display area.

* * * * *